United States Patent [19]
Wright

[11] Patent Number: 5,800,595
[45] Date of Patent: Sep. 1, 1998

[54] SPACED EVAPORATIVE WICKS WITHIN AN AIR COOLER

[75] Inventor: Peter Sydney Wright, Adelaide, Australia

[73] Assignee: William Allen Trusts Pty Ltd, Adelaide, Australia

[21] Appl. No.: 637,694

[22] PCT Filed: Aug. 30, 1995

[86] PCT No.: PCT/AU95/00555

§ 371 Date: Apr. 30, 1996

§ 102(e) Date: Apr. 30, 1996

[87] PCT Pub. No.: WO96/07059

PCT Pub. Date: Mar. 7, 1996

[30] Foreign Application Priority Data

Aug. 30, 1994 [AU] Australia ............... PM 7772

[51] Int. Cl.$^6$ ................ B01D 50/00
[52] U.S. Cl. ............... 95/288; 55/315.1; 62/121; 62/304; 62/309; 62/314; 96/126; 165/60; 261/104; 261/128; 261/153; 261/154
[58] Field of Search ............. 95/210, 211, 227, 95/228, 229, 288, 289; 55/222, 233, 234, 267, 268, 269, 315.1; 261/104, 107, 153, 154, DIG. 3; 62/121, 304, 309, 314, 316; 165/3, 60; 96/126

[56] References Cited

U.S. PATENT DOCUMENTS

| | | | |
|---|---|---|---|
| Re. 20,469 | 8/1937 | Crawford | 95/288 |
| 847,840 | 3/1907 | Smith | 261/104 |
| 1,367,701 | 2/1921 | Haynes | 261/104 |
| 1,769,071 | 7/1930 | Raney | 261/104 |
| 1,819,643 | 8/1931 | Fleisher | 55/268 |
| 1,853,419 | 4/1932 | Harris | 261/153 |
| 1,863,577 | 6/1932 | Morse et al. | 55/222 |
| 1,863,578 | 6/1932 | Morse et al. | 55/222 |
| 1,904,686 | 4/1933 | Humphreys | 62/309 |
| 1,945,464 | 1/1934 | Thomas | 261/104 |
| 2,180,467 | 11/1939 | Heisterkamp | 55/268 |
| 2,565,221 | 8/1951 | Gaugler | 261/104 |
| 4,002,040 | 1/1977 | Munters | 261/153 |
| 4,023,949 | 5/1977 | Schlom et al. | 62/314 |
| 4,137,058 | 1/1979 | Schlom et al. | 62/121 |
| 4,380,910 | 4/1983 | Hood et al. | 62/304 |
| 4,461,733 | 7/1984 | Otterbein | 261/153 |
| 4,484,451 | 11/1984 | Darm | 95/288 |
| 4,582,129 | 4/1986 | Yano et al. | 55/269 |
| 4,708,832 | 11/1987 | Norback | 261/153 |
| 4,781,248 | 11/1988 | Pfeiffer | 165/167 |
| 4,976,113 | 12/1990 | Gershuni et al. | 62/304 |

(List continued on next page.)

FOREIGN PATENT DOCUMENTS

| | | |
|---|---|---|
| 28113/89 | 3/1990 | Australia . |
| 655348 | 12/1994 | Australia . |
| 81769/94 | 12/1994 | Australia . |
| 2459437 | 2/1981 | France . |
| 2546614 | 11/1984 | France . |
| 384666 | 12/1932 | United Kingdom . |
| 1504385 | 9/1993 | United Kingdom . |

OTHER PUBLICATIONS

International Published Appln. WO 96/06312 (PCT/AU95/00515), Feb. 29, 1996.

*Primary Examiner*—Duane S. Smith
*Attorney, Agent, or Firm*—Watts, Hoffmann, Fisher & Heinke Co., L.P.A.

[57] ABSTRACT

To improve both heat transfer and evaporation in a heat exchanger (10, 25, 42) of an air cooler, there are provided a number of spaced narrow wet wicks (13) over which air flows transversely, and those wicks (13) are sandwiched between impervious spacer sheets (11, 12), the surface configuration of the spacer sheets (11, 12) being non-planar so as to increase the areas of the wicks (13) over which air flows, and also to increase air turbulence and thereby mixing, the increased mixing not only assisting in the evaporation of water from wicks (13) but also assisting in the heat transfer through the spacer sheets (11, 12) which define the air passages containing the wicks (13).

14 Claims, 3 Drawing Sheets

U.S. PATENT DOCUMENTS

| | | | |
|---|---|---|---|
| 4,977,753 | 12/1990 | Maisotsenko et al. | 62/121 |
| 5,050,391 | 9/1991 | Tsimerman | 62/304 |
| 5,079,934 | 1/1992 | Vinokurov | 62/304 |
| 5,187,946 | 2/1993 | Rotenberg et al. | 62/314 |
| 5,301,518 | 4/1994 | Morozov et al. | 62/314 |
| 5,315,843 | 5/1994 | Morozov et al. | 62/314 |
| 5,324,230 | 6/1994 | Hist | 454/326 |
| 5,349,829 | 9/1994 | Tsimerman | 261/153 |
| 5,453,223 | 9/1995 | Maisotsenko | 261/153 |

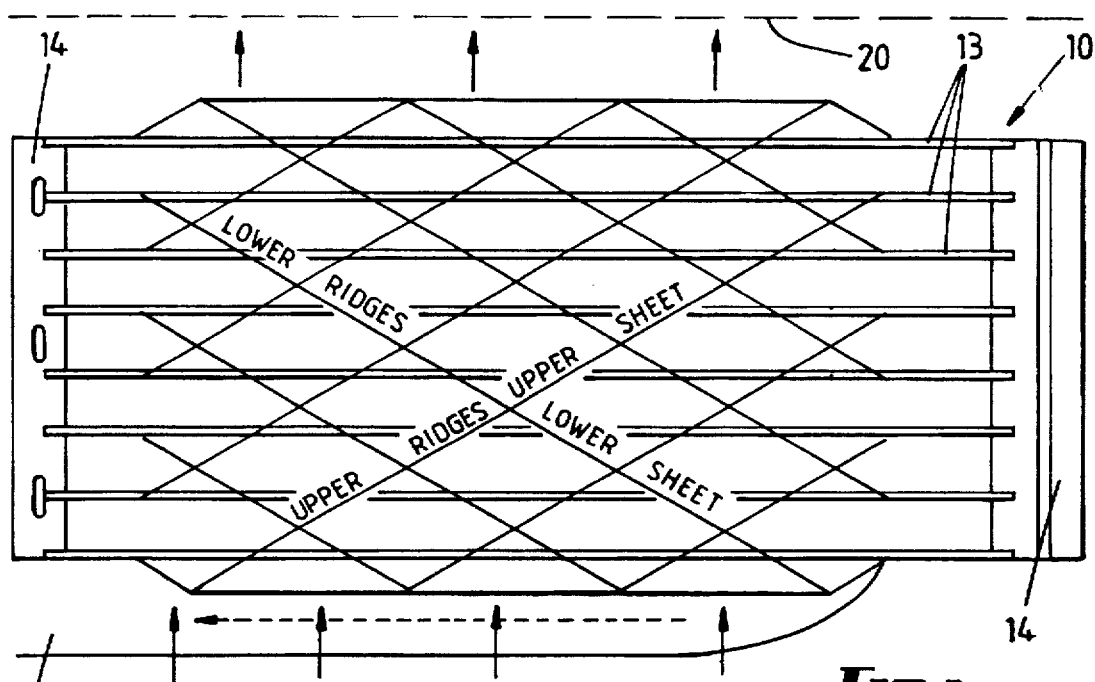
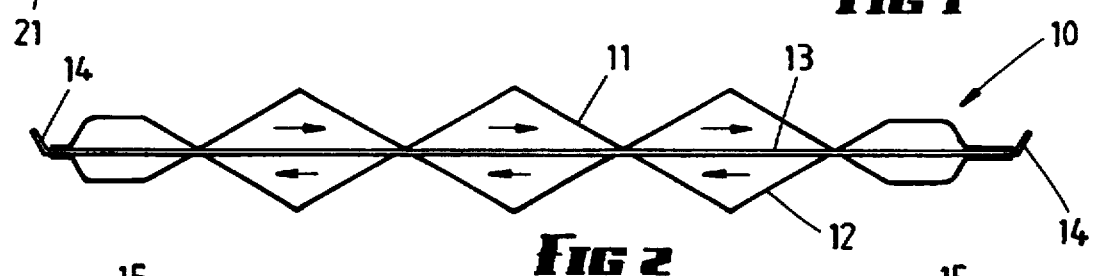
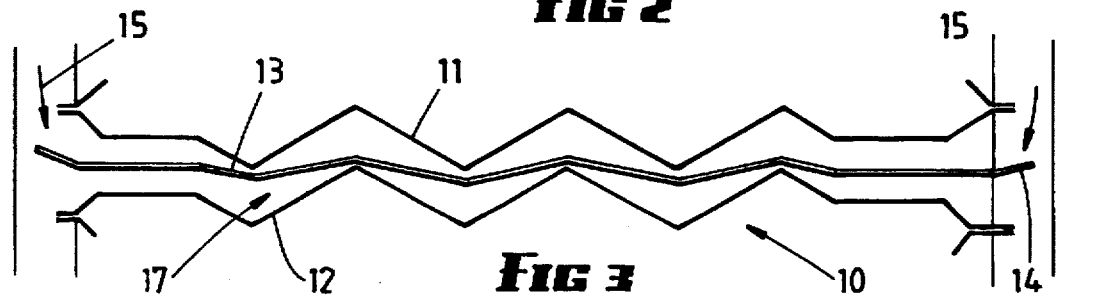
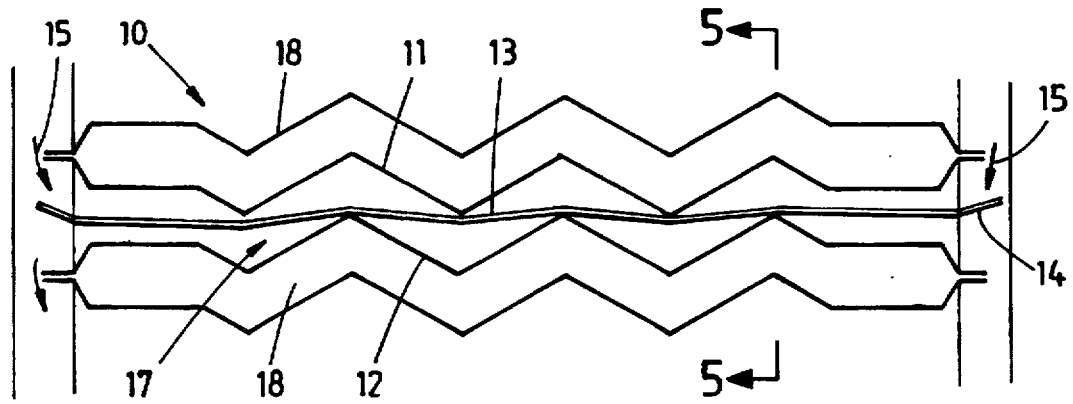

SPACED EVAPORATIVE WICKS WITHIN AN AIR COOLER

This invention relates to an air cooler of the evaporative type which relies upon evaporation of water from a surface to reduce sensible heat, by the conversion to latent heat, and to a heat exchanger useable therein.

BACKGROUND OF THE INVENTION

At the present time, more humid but cooler air than ambient is transmitted to an occupied space, by blowing air through woodwool which is retained between spaced perforate panels such as wire grids, the woodwool being retained moist by passing water through it, and the air evaporating the water mostly from the surface of the wet woodwool. In the alternative there is provided a honeycomb type of structure of wettable lignocellulose material wherein the air is made turbulent as it passes through the material, and out to the conditioned space. In both types, the conditioned space has humidity increased, but this is not feasible for tropical climates wherein the humidity is frequently between 80% and 90%. Consequently, attempts are being made and have been made in the past to utilise indirect cooling, employing heat exchangers so that the air which enters the conditioned space can be dry and cool, the more humid air being discharged. This invention is directed to both types of air conditioners, but most importantly to the indirect evaporative cooler type.

Heat exchangers tend to be very bulky and occupy a large amount of space, and an object of the invention is to provide improvements whereby a heat exchanger can be more efficient, and the evaporation be more effective than has been known heretofore, thereby reducing the heat exchanger size. It is a further object to incorporate further improvements beyond those disclosed, for example in U.S. Pat. Nos. 5,301,518 and 5,315,843 (Morozov et al). In said specification the wicks were contemplated to be sheets of absorbent material, and one object of this invention is to provide improvements in evaporation rate achievable by use of wicks, and also improvements in heat transfer rate achieved, over and above what is described therein.

PRIOR ART

The Patent records contain many references to indirect cooling (eg. Hood U.S. Pat. No. 4,380,910), diagonal cross-flow heat exchangers (Pfeiffer U.S. Pat. No. 4,781,248), and in the aforesaid Morozov patents, references are made to precooling air before evaporating water into it from the wicks, and employing laminar flow.

It has been established by the Applicants that the evaporation which takes place as air passes over a wet wick largely occurs at the entry edge of the wick, and also to a slightly lesser extent at the trailing edge of a wick, but between the entry edge and the trailing edge of the wick, the evaporation rate is less.

Furthermore, it has been found that similar conditions exist with heat transfer.

BRIEF SUMMARY OF THE INVENTION

With the object of improving both heat transfer and evaporation, in an embodiment of this invention, there are provided a plurality of spaced narrow wicks over which air flows transversely, and those wicks are sandwiched between impervious spacer sheets, the surface configuration of the spacer sheets being non-planar so as to increase the areas of the wicks over which air flows, and also to increase air turbulence, and thereby mixing, the increased mixing not only assisting in the evaporation of the water from the wicks but also assisting in the heat transfer through the spacer sheets which define the air passage containing the wicks.

In another embodiment, the wicks extend generally transversely with respect to air flow between ends of a heat exchanger defined by spacer sheets of corrugated cross sectional shape wherein the corrugations extend in diagonal directions and cross each other in alternate sheets. Thus airflows over both sides of each wick and evaporation is greater than if over one side only, this enhancement being in addition to evaporation improvement due solely to periodic restart of the evaporation process.

It is established in the science of air flow through conduits that at relatively low Reynolds numbers (as encountered in evaporative air coolers) the flow has a tendency to be laminar, forming a central layer of high velocity air flanked by layers of low velocity air at the inner surface of the conduit. Thus in all prior art known to the Applicant, heat transfer has been required to take place over much of the length of a conduit through the flanking layers of low velocity air, which is a poor conductor of heat. The use of corrugated sheets, mentioned above, of course, does much to cause mixing within the spaces between the sheets which define the air flow passages, but if there is laminar flow, it is of importance that evaporation rates are not thereby diminished excessively, and in an embodiment of the invention, the wicks are not only relatively narrow with respect to the air flow passage length, but they are located transversely in a spaced array and extend between adjacent sheets, so that each wick separately intercepts the central core of air flow which traverses the wicks transversely with respect to the wick length. In being narrow, there is little opportunity for development of flanking layers of low velocity air.

It is of course necessary that the wicks be continuously supplied with water, and in an embodiment of the invention the wicks protrude beyond side edges of a heat exchanger and are wetted by water being pumped from a sump to a location above the protruding portions of the wicks.

Even if wicks are flat, and transposed from the usual vertical disposition to a horizontal or slanting disposition, nevertheless sometimes there is difficulty in retaining the surfaces of the wicks in a moist condition. If, for example, the action is an outward flow of water from within a hollow core of perforate material, the water will continue to flow whether or not air is passing over it, although that flow is likely to be at a higher rate when the evaporation rate is high than when it is low. It is important that a wick should have a true wicking function wherein the surface moisture of the wick does not vary excessively under different load conditions of evaporation. Thus it is necessary for the, wicks to be able to transport moisture from their outer ends which are wetted to their innermost locations which will tend to dry out first, and in an embodiment of the invention the wicks may each be hollow, or comprise contiguous layers providing an interface, or interfaces, therebetween, this being found to accelerate the flow of water, and to provide a degree of flushing. In some instances the interfaces can be established by laminates in the wick, in some instances those laminates can be effected by a "flat tube" configuration. In another alternative, a circular tube configuration can be used, for example a tube having its outer surface being extended into two flanking wings.

The shape of a heat exchanger stack can vary for different requirements, and for example may be rectangular with the wicks extending outwardly from the sides, and arranged for the conditioning air to flow through dry channels from inlet openings to outlet openings, while the air to be humidified is arranged to flow through wet channels between adjacent sheets of the heat exchanger where it passes over the wicks and out to discharge. Such an arrangement has the advantage that it is possible to design a configuration using a single fan only. If, however, a more efficient six sided shape is used for the heat exchanger, use is preferably made of separate fans, one for driving the air to be conditioned from outdoors, and through the heat exchanger, and the other fan being used to assist impelling the air to be humidified to flow through wet channels between adjacent sheets which separate the wet and dry channels, the wet channels containing the wicks.

In some arrangements, the wicks can be individually retained each on one surface to a sheet of impervious plastics material, but in this invention, most of the surfaces of the wicks are exposed to air flow, and the heat transfer function is separated from the wicking function. Thus in this invention there is a much greater need for good transport of water along the wicks than when they are adhered to impervious material.

In some conventional prior art, use has been made of a desiccant for dehumidifying air, and configurations are conventional wherein the desiccant solution is brought into contact with all the air which is to be cooled, including air to be rehumidified by passing through the wet channels wherein the air is subject to exposure to water which it evaporates. As described below, the use of a six sided heat exchanger simplifies the configuration of an air cooler, in that the counterflow component of air flow direction exceeds the cross flow component.

BRIEF DESCRIPTION OF THE DRAWINGS

FIG. 1 is a plan view of a heat exchanger utilising spaced wet wicks between corrugated sheets;

FIG. 2 is a section through a wick which is retained between the sheets where the ridges of adjacent sheets touch each other;

FIG. 3 is a section which shows the wick shape in the zig-zag spaces between the points of contact of the ridges;

FIG. 4 illustrates how water channels can be used to establish a water cascade to wet both ends of each wick;

Figure 5:
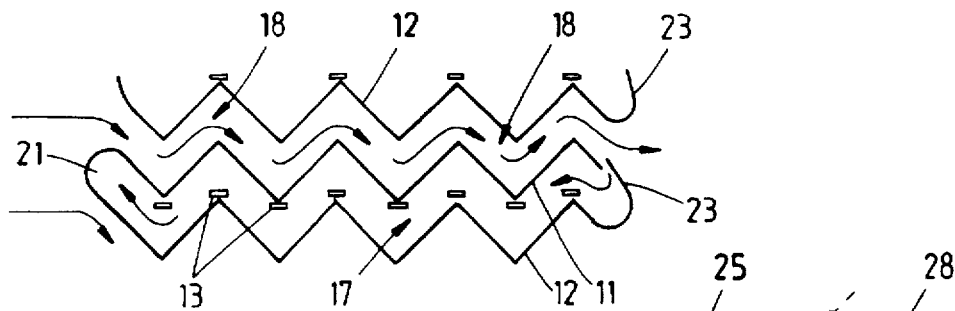
FIG. 5 is an end elevational section taken on line 5—5 of FIG. 4 which illustrates the configuration of the wicks in cross-section when they are disposed between the sheets as shown in FIGS. 3 and 4.

It must be emphasised that in all of the drawings, no attempt has been made to show an accurate scale, and the drawings should be regarded as diagrammatic, so as to be suitable for explanation.

Referring firstly to FIGS. 1 to 4, a heat exchanger 10 comprises a plurality of impervious corrugated plastic sheets arranged in pairs, each upper sheet 11 having air flowing along the channels of one corrugation and each lower sheet 12 in a diagonally different direction.

FIGS. 1, 2 and 3 illustrate only the wet channels, and each wet channel comprises a plurality of wet wicks 13 which extend as edge flaps 14 projecting beyond the edges of sheets 11 and 12, and intercept water 15 which flows over the edge flaps, and from there along the wicks into the spaces between the sheets 11 and 12. Water is pumped from a sump to spray or spreader means as in prior art air coolers. These are not illustrated herein.

A consideration of the plan view of FIG. 1 will show that the wet wicks 13 can either be randomly positioned, they can be located in the channels 17 which are of zig-zag shape (FIGS. 3 and 4) or they can be located between the intersecting points of the ridges of the sheets 11 and 12, but in all cases are "suspended" between the sheets, but supported by sheets 12 (FIG. 2). As shown best in FIGS. 4 and 5, the wet channels 17 are flanked above and below by dry channels 18, these channels being between sheets 11 and 12 which are a portion of a large stack.

FIGS. 1, 4 and 5 illustrate one method of getting reverse flow of air from the cool end of the dry channels 18 to flow in the reverse direction to the wet channels 17. On the downstream side of the air flow there is provided a perforate grid 20 which creates a back pressure sufficient for some of the air to flow back through the wet channels 17 and finally be exhausted at 21. In FIG. 5, it is shown how air deflectors 23 can be used at the downstream end of the dry channel 18 to deflect a small proportion (possibly about 25%) of the air emitting from the heat exchanger back through the wet channels 17. Other simple deflection means can be used.

Figure 6:
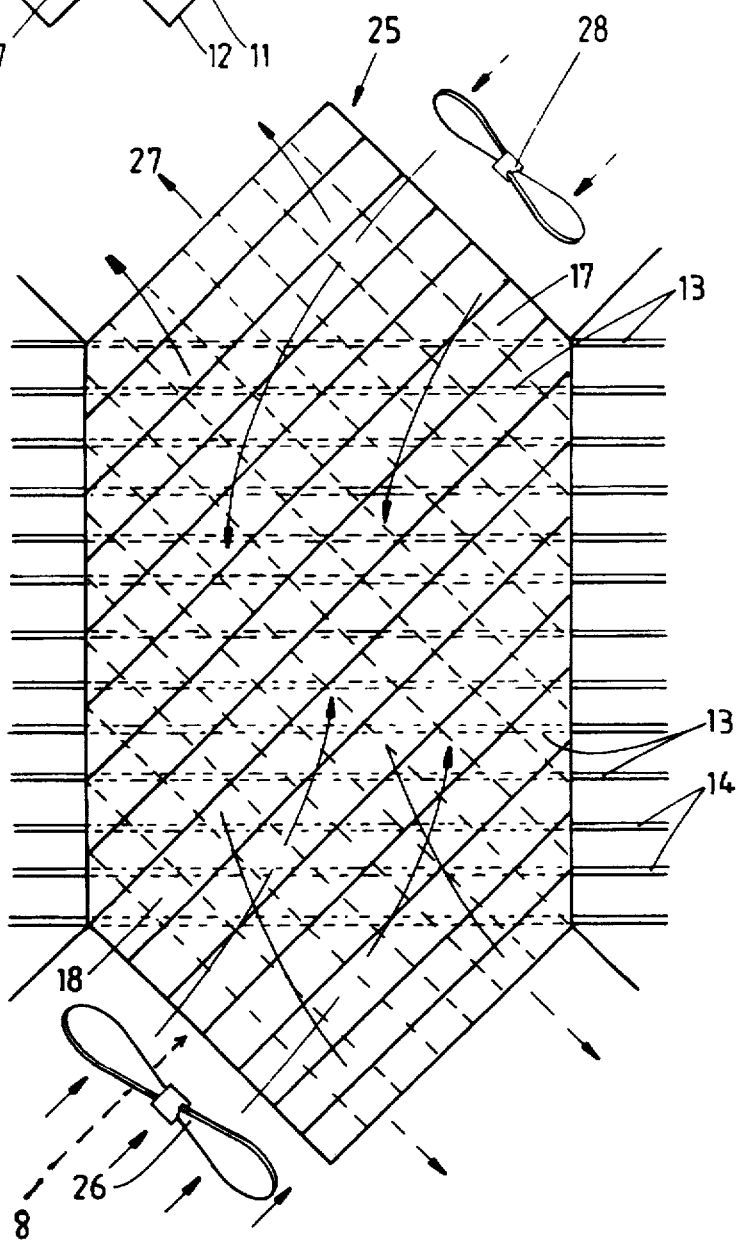
FIG. 6 is a top view of a six-sided heat exchanger having two fans.

FIGS. 6 through to 10 illustrate a six-sided heat exchanger 25 (which is the preferred shape), wherein a relatively large fan 26 drives air through the dry channels 18 of the heat exchanger 25, in the same way that air passes through the dry channels, in the first embodiment. That air is discharged at 27, and passes to a conditioned space. Either air from the conditioned space, or some of the air being discharged at 27 is deflected to a second smaller fan 28 to be driven through the wet channels 17 where they pass over the wicks 13 as described above.

Figure 7:
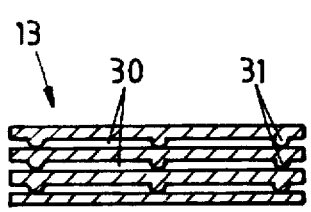
FIG. 7 is a cross-section through a laminated wick.

The cross-sectional shape of the wicks 13 can be simply rectangular, can comprise ducts or, as shown in FIG. 7, a series of closely spaced laminae 30, the spacing of which is arranged for the optimum capillary action of water along the wicks. In FIG. 7, the spaces between laminae 30 (which are very small) are formed by small ribs 31. It will be appreciated that FIG. 7 is drawn to an extremely large scale to show this, and in some instances there is no need even for the ribs 31. If ducts are used (for example in extruded hollow sections), they need to be fully surrounded by sufficient wicking material that the outer surfaces of the wicks remain moist without being "flooded" to the point where they might drip water.

In all the above embodiments, most of the wick surface areas are clear of obstruction so that air flows over most of the surface areas, optimising evaporation in "periodic restarts."

Figure 8:
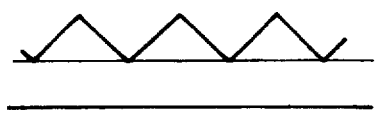
FIG. 8 is a fragmentary end view of FIG. 6 showing the pattern of air passages using corrugated sheets.
Figure 9:
FIG. 9 is an end elevation of FIG. 8.

FIGS. 8 and 9 are complementary to one another, FIG. 8 being a view in the direction of arrow 8 on FIG. 6 and FIG. 9 being an end elevation of FIG. 8.

Figure 10:
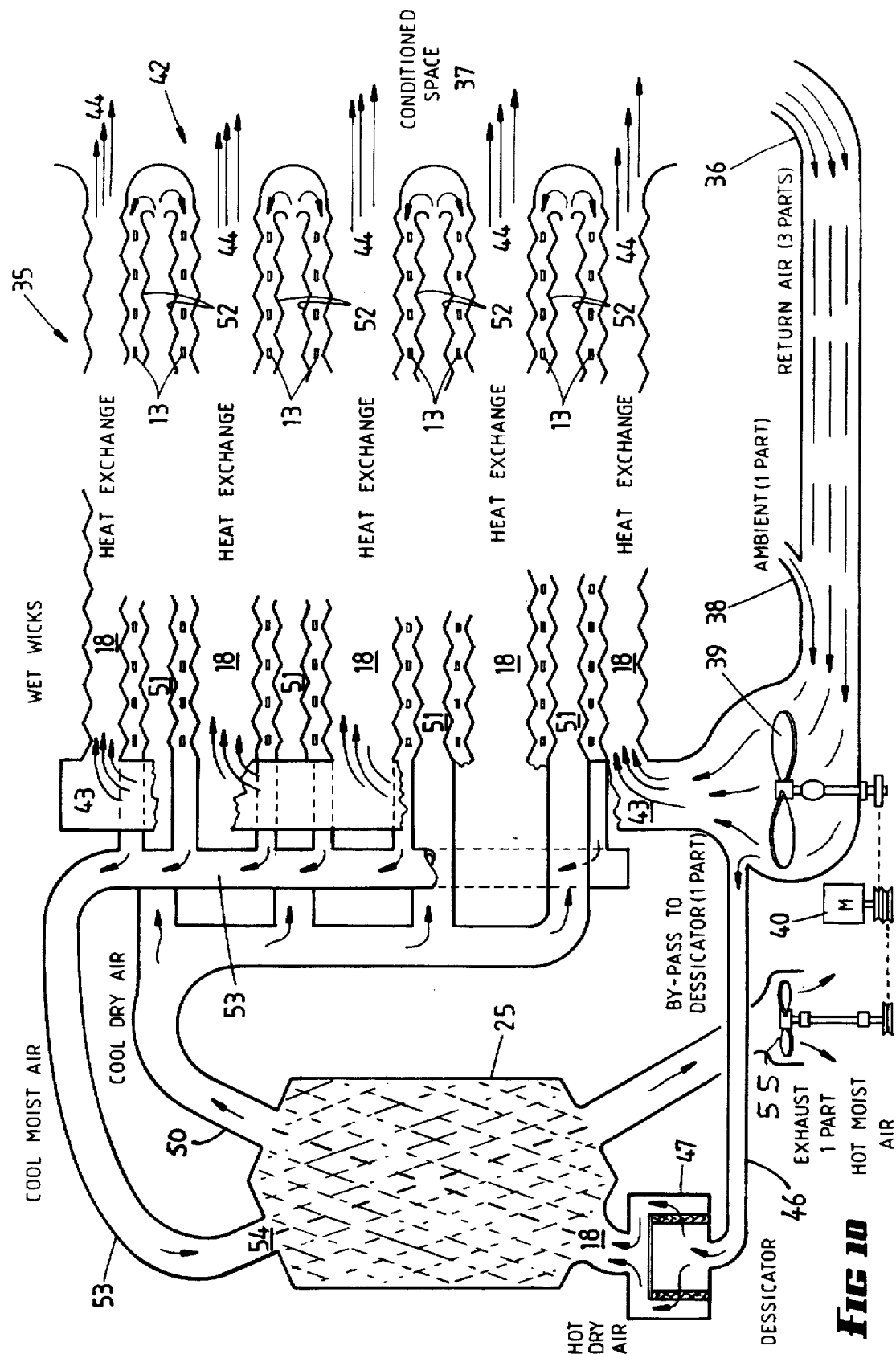
FIG. 10 is a diagrammatic representation showing how the six-sided arrangement of FIG. 6 simplifies the configuration of an evaporative air cooler wherein only the air to be rehumidified is dehumidified.

FIG. 10 shows diagrammatically an evaporative air cooler 35 wherein an intake duct 36 returns approximately three "parts" by volume of air from a conditioned space 37, which is supplemented by one "part" of ambient air introduced through a branch 38.

A large flow fan 39 is driven by motor 40 and impels approximately three "parts" to dry channels 18 of a heat exchanger 42, through manifold 43. The dry channels cool the air without humidifying and deliver at outlets 44 to the conditioned space 37.

A fourth "part" of air is delivered by duct 46 to a desiccator 47 and hot dry air from desiccator 47 passes through dry channels 18 of heat exchanger similar to heat exchanger 25 where it is cooled, to a second distribution duct 50 to dry air channels 51 of heat exchanger 42. At the downstream ends of channels 51, the cooled air is reversed into wet channels 52 where it is cooled by humidification by passing over wicks 13, before being discharged into duct 53 to pass through the secondary channels 54 of heat exchanger 25. Since the air entering the channels 54 is already cool and moisture laden, in some instances the use of wicks may not be necessary in heat exchanger 25 of air cooler 35, but use of wicks can reduce size of heat exchanger 25, since, as the air traverses channels 17, it gains sensible heat and can therefore evaporate further moisture. The small flow fan 55 is much smaller than fan 39 but cooperates therewith in the "push-pull" impulsion of air flow through the two heat exchangers. The fan 55 can of course be positioned elsewhere in the exhaust air flow circuit.

The above description has been limited to horizontal sheets 11 and wicks 13. The invention however can be equally effective if they slant, or they are vertical. If the wicks are vertical, they can be effectively wetted by their upper ends dipping into troughs of water, the water being transported through the wicks by a syphoning action.

A consideration of the above embodiment will indicate that the invention provides the following advantages over prior art otherwise known to the Applicant:

a. the heat exchanger size is reduced because of the enhanced evaporation from the 'suspended' wicks;
b. the evaporation is further enhanced by the narrow width of the wicks providing a large number of evaporation zones throughout the heat exchanger;
c. the diagonally disposed adjacent panels which define the channels introduce a great deal of air mixing within the channels due to interaction of air flow between the intersecting channels;
d. the action of the water washing the wick edge flaps or the laminated or tubular wicks ensures there is always sufficient moisture on the surfaces of the wicks to satisfy the requirements of evaporation, without necessarily flooding the wick surfaces (which is regarded as most undesirable);
e. the heat exchanger 25 together with the desiccator 47 requires only that air which is to be rehumidified to be dehumidified, and thereby a very high degree of evaporation can take place in the wet channels of heat exchanger 42, all this being achieved without excessive energy;
f. as the desiccator is regenerated, the water released from the desiccator is very pure, and can be reused, thus avoiding salt build-up on the wicks;
g. use of two fans enables adequate control to be exercised over the wet air flow as well as the dry;
h. the air to be wetted in heat exchanger 42 has been desiccated, thereby making it possible to achieve cooling below dew point of the ambient air;
i. discarded cool moist air improves effectiveness of heat exchanger 42 in FIG. 10;
j. FIG. 10 shows how two fans may be driven by a single motor, which is sometimes desirable. It may be noted that the fans are in a "push-pull" configuration with respect to air flow through the continuous wet air channels 52 of heat exchanger 42 and 17 of heat exchanger 25.
k. Both heat exchangers 25 and 42 have a large contra flow component of air movement and only a small cross-flow component, the diagonal channels intersecting by an angle not exceeding 90 degrees.

The claims defining the invention are as follows:

1. A heat exchanger comprising a stack of spaced, non-planar sheets defining between them a plurality of alternate dry channels and wet channels, each said channel terminating at its ends in air inlet and air outlet openings, a plurality of spaced wicks extending across said wet channels transversely with respect to air flow and partly in suspension between said non-planar sheets, said non-planar sheet including corrugations disposed diagonally with respect to air flow and being inclined with respect to one another, at least some of said corrugations contacting and spatially locating at least some of the wicks;

wetting means associated with said wicks, and, the configuration of said spaced sheets and said wicks being such that, when in use, said wetting means maintain surfaces of said wicks moist, and air flows over most of the surface areas of said wicks.

2. A heat exchanger according to claim 1 wherein said wicks extend beyond said channels and project at their ends therefrom as edge flaps, said wetting means comprising means which apply water to said edge flaps.

3. A heat exchanger according to claim 2 wherein said wicks are supported by and suspended between ridges of said corrugations.

4. A heat exchanger according to claim 1 wherein said wicks comprise ducts which are surrounded by sufficient thickness of wicking material that, in use, outer surfaces of said wicks remain moist without being flooded.

5. An evaporative cooler comprising a heat exchanger according to claim 1, fan means, a manifold extending from a downstream side of said fan directing air flow from said fan means through some at least of said channels to a conditioned space.

6. An evaporative cooler according to claim 5 wherein said air flow to a conditioned space is through one of two sets of dry channels in said heat exchanger, said cooler also comprising a desiccator, said fan means impelling a further air flow through said desiccator, the other set of said dry channels to thereby cool the further air flow, and returning the thus cooled air through said wet channels of the heat exchanger thereby humidifying and further cooling said further air flow.

7. An evaporative cooler comprising a first heat exchanger according to claim 1 having two sets of dry channels and one set of wet channels, a second heat exchanger, both said heat exchangers comprising a stack of spaced polymeric sheets each having corrugations which are inclined with respect to the corrugations of an adjacent sheet by less than 90 degrees, the wicks of said first heat exchanger being supported by and suspended between ridges of said corrugations, a plurality of fans, a manifold extending from a downstream side of a said fan directing air flow through one said set of dry channels of the first said heat exchanger into said air conditioned space, a desiccator, another of said fans impelling air flow through the desiccator, through one set of dry channels of said second heat exchanger, through the other said set of dry channels of the first said heat exchanger, through said wet channels and through a second set of channels of said second heat exchanger to exhaust.

8. An evaporative cooler according to claim 7 wherein said fans include a relatively large flow fan and a relatively small flow fan, an intake duct extending from said air conditioned space to said large fan, an ambient air branch into said intake duct arranged to introduce some ambient air into a return air stream upon operation of said large fan, an outlet duct extending from a downstream side of said large fan communicating with said desiccator for said impelling of air flow therethrough, said small flow fan communicating with said second set of channels of said second heat exchanger.

9. An evaporative cooler according to claim 7 wherein the sizes and configurations of said fans, trunk and heat exchange channels are such that, in use, more air is impelled to flow through said manifold, through said one set of dry channels and into said conditioned space, than through said second heat exchanger to exhaust.

10. A method of cooling air in an evaporative air cooler comprising moistening a plurality of spaced wicks carried by and suspended between corrugations of a stack of spaced corrugated sheets and impelling an air flow along the corrugations and transversely over and around said wicks to thereby humidify and cool the air in a periodic restart of evaporation.

11. A method according to claim 10 wherein said wicks are arranged in alternate channels, being wet channels of said stack, the other alternate channels being dry channels, said wet and dry channels being channels of a heat exchanger, and defined by spaced sheets having corrugations, said impelling of air flow through said wet channels being in one direction, and further impelling a flow of supply air in a contra flow direction through said dry channels, thereby cooling said supply air by heat transfer to said wet channels.

12. A method according to claim 11 comprising desiccating air, and cooling the desiccated air in a heat exchanger, wherein said desiccated air is said air which is subsequently impelled through said wet channels.

13. A method according to claim 11 wherein some return air from said conditioned space is included in said flow of supply air.

14. A method according to claim 11 comprising impelling said flow of supply air by a relatively large flow fan, including both return air and ambient fresh air in said supply air, bypassing some of supply air downstream of said large flow fan into a desiccator to form a stream of hot dry air, impelling said stream of hot dry air through one set of dry channels of a second heat exchanger thus cooling said stream of hot dry air before impelling along said corrugations as said air flow which is cooled by humidification in a periodic restart of evaporation, returning said air stream as cool moist air through a second set of channels of said second heat exchanger, and passing air through a relatively small fan to exhaust from said second set of channels of said second heat exchanger.

* * * * *